United States Patent
Zhu et al.

(10) Patent No.: US 10,896,341 B2
(45) Date of Patent: Jan. 19, 2021

(54) EFFICIENT DEFECT LOCALIZATION/SEGMENTATION FOR SURFACE DEFECT INSPECTION

(71) Applicant: INTERNATIONAL BUSINESS MACHINES CORPORATION, Armonk, NY (US)

(72) Inventors: Sheng Nan Zhu, Shanghai (CN); Guo Qiang Hu, Shanghai (CN); Jun Zhu, Shanghai (CN); Jing Chang Huang, Shanghai (CN); Peng Ji, Nanjing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/192,001

(22) Filed: Nov. 15, 2018

(65) Prior Publication Data
US 2020/0160083 A1    May 21, 2020

(51) Int. Cl.
*G06K 9/62* (2006.01)
*G06K 9/46* (2006.01)
*G06N 3/04* (2006.01)
*G06K 9/32* (2006.01)
*G06T 7/00* (2017.01)
*G06N 3/08* (2006.01)

(52) U.S. Cl.
CPC ......... *G06K 9/3233* (2013.01); *G06K 9/4652* (2013.01); *G06K 9/6256* (2013.01); *G06K 9/6276* (2013.01); *G06N 3/0418* (2013.01); *G06N 3/08* (2013.01); *G06T 7/001* (2013.01)

(58) Field of Classification Search
None
See application file for complete search history.

(56) References Cited

U.S. PATENT DOCUMENTS

| | | | |
|---|---|---|---|
| 9,000,790 B2 | 4/2015 | Celi et al. | |
| 2016/0277863 A1* | 9/2016 | Cahill | H04R 3/005 |
| 2018/0068432 A1 | 3/2018 | Gao et al. | |
| 2019/0369175 A1* | 12/2019 | Schwartz | B01J 35/04 |
| 2020/0051225 A1* | 2/2020 | Barron | G06T 5/40 |

FOREIGN PATENT DOCUMENTS

WO    2018131737 A1    7/2018

OTHER PUBLICATIONS

Kolesnikov, A. et al., "Seed, Expand and Constrain: Three Principles for Weakly-Supervised Image Segmentation" arXiv:1603.06098v3 (Aug. 2016) pp. 1-20.

(Continued)

*Primary Examiner* — Idowu O Osifade
(74) *Attorney, Agent, or Firm* — Tutunjian & Bitetto, P.C.; Joseph Petrokaitis

(57) ABSTRACT

A computer implemented method for surface defect inspection that includes recording an optical image of a surface including a defect; converting the optical image including the defect into a heat map; extracting a region of interest including the defect from the heat map; and comparing the region of interest including the defect from the heat map to a binary classification model using a sliding window based voting mechanism to determine if the defect is greater than or less than a threshold failure value.

20 Claims, 9 Drawing Sheets

(56) References Cited

OTHER PUBLICATIONS

Zhou, B. et al., "Learning Deep Features for Discriminative Localization" 2016 IEEE Conference on Computer Vision and Pattern Recognition (CVPR) (Jun. 2016) pp. 2921-2929.

Tschopp, F. et al., "Efficient Convolutional Neural Networks for Pixelwise Classification on Heterogeneous Hardware Systems" 2016 IEEE 13th International Symposium on Biomedical Imaging (ISBI) (Apr. 2016) pp. 1225-1228.

Ferguson, M. et al., "Automatic Localization of Casting Defects with Convolutional Neural Networks" 2017 IEEE International Conference on Big Data (Big Data) (Dec. 2017) pp. 1-10.

\* cited by examiner

EFFICIENT DEFECT LOCALIZATION/SEGMENTATION FOR SURFACE DEFECT INSPECTION

BACKGROUND

Technical Field

The present invention generally relates to surface defect inspection, and more particularly employing visual inspection automation with artificial intelligence to determine the incidence of surface defects.

Description of the Related Art

There is a growing demand on visual inspection automation and intelligence technologies across industry domains. Some examples, of technologies for defect inspection by visual inspection automation in combination with intelligence technologies include inspection for defects in smartphone parts; component level defects inspection on printed circuit board (PCB); and light emitting diode panel defect detection. It is noted that the component level defect inspection for PCBs can locate up to 20 different types of defects. It is noted for LED panel inspection there can be up to 120 different types of defects. Inspection can involve a small defect area in a large picture. The defect area needs to be detected and extracted first for accurate classification. Accurate defect segmentation helps to identify the size and shape of the defect and has an impact on subsequent processing flow, e.g., repair, rework, clean, ignore, disposal and combinations thereof.

SUMMARY

In accordance with an embodiment of the present invention, a computer implemented method for surface defect inspection is provided that includes recording an optical image of a surface including a defect; and converts the optical image including the defect into a heat map. A region of interest including the defect is extracted from the heat map. The method continues with comparing the region of interest including the defect from the heat map to a binary classification model using a sliding window based voting mechanism to determine if the defect is greater than or less than a threshold failure value.

The binary classification model is formed using an offline training process that includes classifying optical images as having defects or being free of defects; and applying a position disturbance function to the images having defects, the position distribution function including creating heat maps for the images having defects, and taking multiple sections of the heat map each of the sections varying a location for the defect to provide cropped images for training data. The classification model is provided from the cropped images for training data using machine learning.

In another aspect, the present disclosure provides a system for surface defect inspection. The system for surface defect inspection includes a camera for taking optical images from a sample of a surface having surface defects; a heatmap generator that converts the optical images having surface defects into heatmaps; and a region of interest (ROI) extractor that extracts a region of heat map including the defect. The system may further include an analyzer including memory storing instructions to be performed by a hardware processor for classifying whether surface defects render a failed sample. The analyzer compares the region of interest including the defect from the heat map to a binary classification model using a sliding window based voting mechanism to determine in the defect in greater than or less than a threshold failure value. In some embodiments, the system can further include a trainer for producing the binary classification model from optical images including defects. In some embodiments, the trainer includes memory having a set of instructions to be executed by a hardware processor to classifying optical images as having defects or being free of defects; applying a position disturbance function to the images having defects, the position distribution function including creating heat maps for the images having defects, and taking multiple sections of the heat map each of the sections varying a location for the defect to provide cropped images for training data; and providing the classification model from the cropped images for training data.

In yet another aspect, the present disclosure provides non-transitory computer readable storage medium that includes a computer readable program for surface defect inspection. The computer readable program when executed on a computer causes the computer to perform the steps of recording an optical image of a surface including a defect; converting the optical image including the defect into a heat map; extracting a region of interest including the defect from the heat map; and comparing the region of interest including the defect from the heat map to a binary classification model using a sliding window based voting mechanism to determine in the defect in greater than or less than a threshold failure value.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
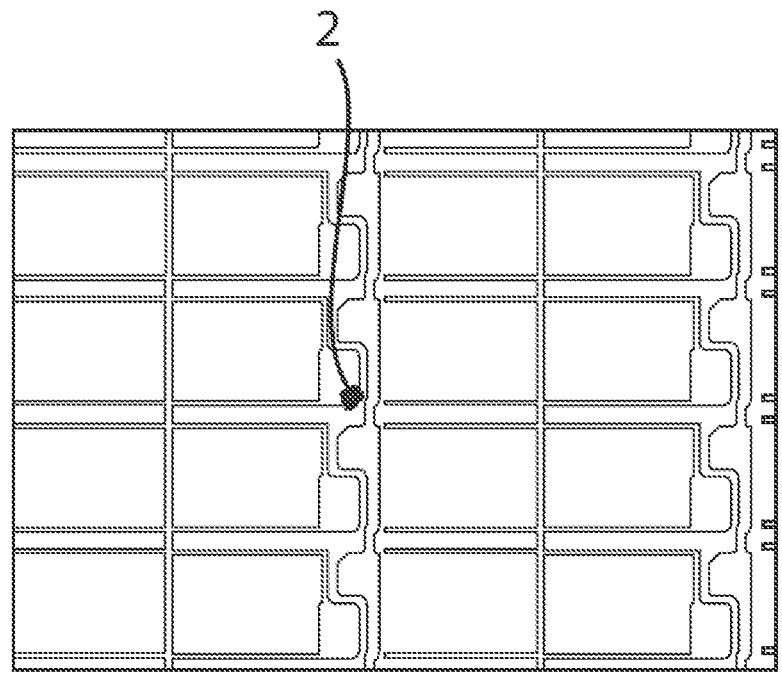
FIG. 1 is a photograph as used for image level labels that are collected using a camera and are labeled using bounding boxes and pixel-level labels.

The methods, systems and computer programs of the present disclose achieve accurate defect segmentation yet only require easily obtained image-level labels. Pixel-level labels demand expensive labeling effort. The methods, systems and computer program products use images with image level labels to train a classification model and obtain the activation heatmap for each training raw image. Heatmap position disturbance not only augments datasets, but also achieves more robust translation invariance of the model to get more accurate segmentation. The use of position disturbance of region of interest (ROI) on heatmap to generate the defect/good crop image, augment datasets and enhance translation invariance of the classification model. The methods, systems and computer program products described herein may use a sliding window through the ROI of raw images based on heatmaps to classify each window region, then take voting mechanisms to superpose defect confidence score, and finally to utilized normalized data and threshold data to get accurate segmentation results. Exemplary applications/uses to which the present invention can be applied include, but are not limited to: surface defect inspection of microelectronics, surface defect inspection of circuit boards, such as printed circuit boards (PCBs), of desktop computers, mobile computers, tablet computers, phones, smartphones, and like devices. Other exemplary applications for the methods, systems and computer program products of the present disclosure may also include surface defects in mechanical structures, such as automotive components and aerospace surfaces. Other exemplary applications include surface inspection of display screens, such as light emitting diode (LED) display screens.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings in which like numerals represent the same or similar elements and initially to FIG. 1, a method is provided for efficient defect localization/segmentation for surface defect inspection.

Semantic segmentation is one of the high-level task that paves the way towards scene understanding. Semantic segmentation is a natural step in the progression from coarse to fine inference. Semantic segmentation can include the steps of locating an origin of an image at a classification stage, which consisting of making a prediction for a whole input. The next step is localization/detection, which provide not only the classes but also additional information regarding the spatial location of those classes. Finally, semantic segmentation achieves fine-grained inference by making dense predictions inferring labels for every pixel, so that each pixel is labeled with the class of its enclosing object ore region. One example of semantic segmentation is convolutional networks for semantic segmentation. Fully Convolutional Network (FCN) learns a mapping from pixels to pixels, without extracting the region proposals. FCN networks provide accurate object positioning in the granularity of pixel. There is a very high labeling effort in training data preparation with FCN networks.

Another form of segmentation may be referred to as weakly supervised image segmentation, which can include seed, expand and constraint steps. This is an example of object segmentation with image labels, rough segmentation and low accuracy. In this type of segmentation it is difficult to adjust the parameters to suit all situations of image segmentation.

Figure 2:
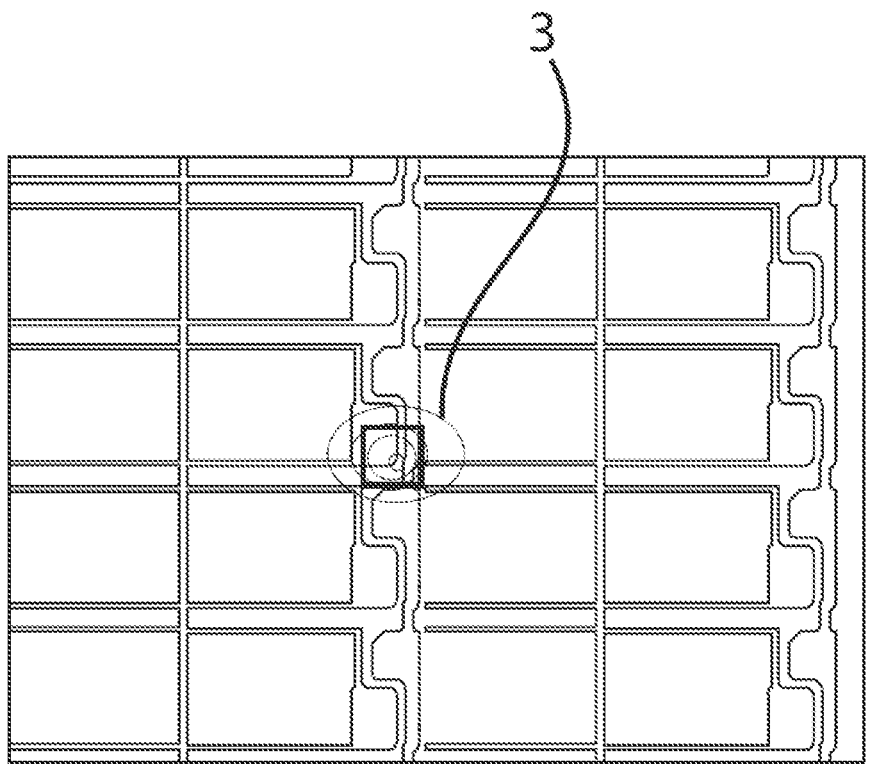
FIG. 2 is heat map of the photograph that is depicted in FIG. 1, in which rough relevant areas are illuminated, in accordance with one embodiment of the present invention.

In view of the aforementioned difficulties, a system and apparatus for efficient defect localization/segmentation for surface defect inspection is provided. The methods, systems and computer program products of the present disclosure may employ image-level labels that can be collected more efficiently than objects that are labeled by bounding boxes and pixel-level labels. Image-level labels may be collected from optical photographs which can be taken using a camera. FIG. 1 is a photograph as used for image level labels that are collected using a camera and are labeled using bounding boxes and pixel-level labels. In FIG. 1, the defect is identified by reference number 2. Recent deep learning results interpretation work showed activation heatmaps that are able to illuminated rough relevant area in the input image that most intensively affect the corresponding classification results. For surface defect inspection, heatmaps can cover the entire defect area roughly but not exactly. FIG. 2 is heat map of the photograph that is depicted in FIG. 1, in which rough relevant areas are illuminated, as identified by reference number 3. For tiny defects, sliding window method based on classification model can achieve accurate pixel-wise segmentation by voting mechanism.

Figure 3:
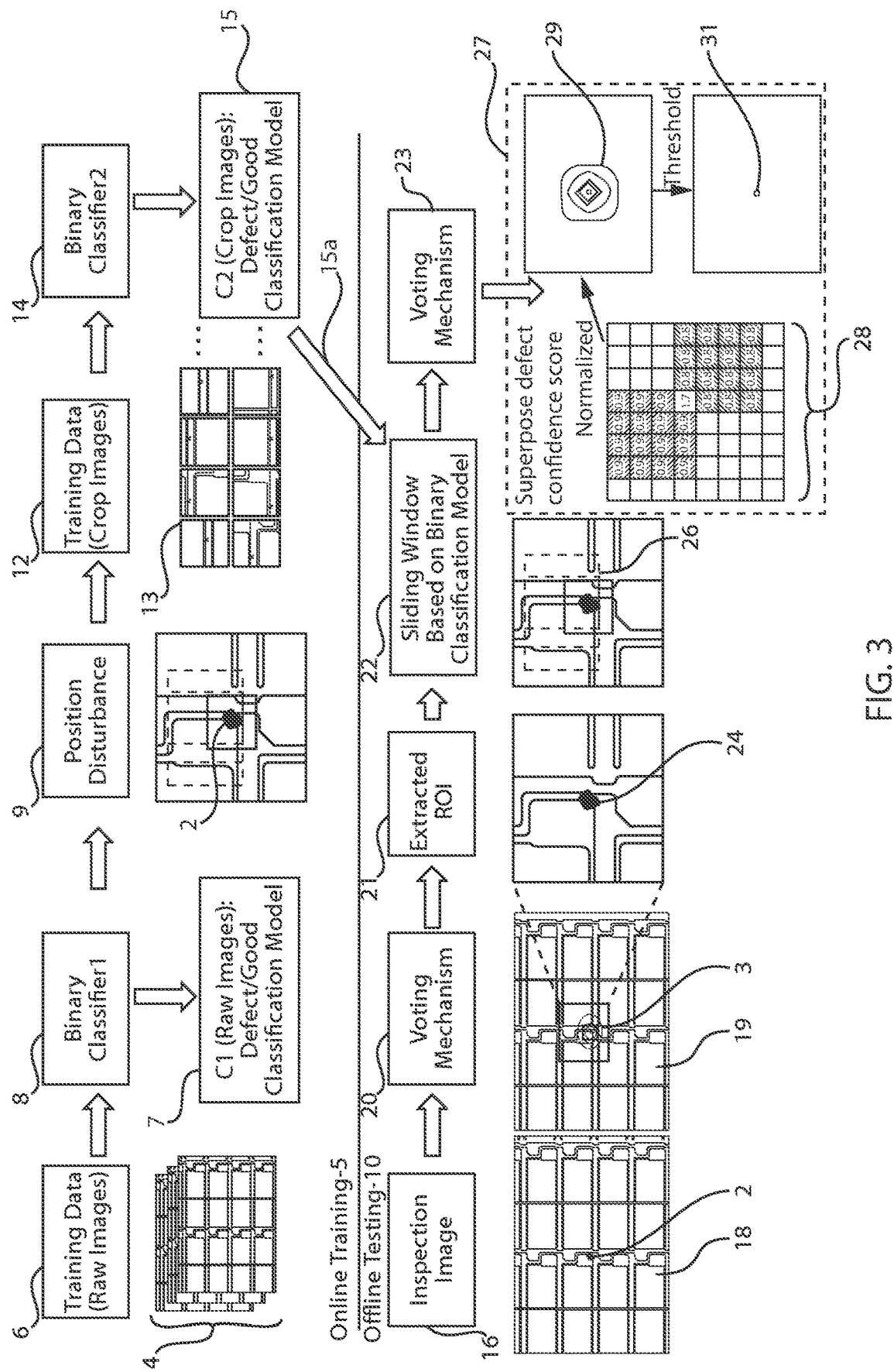
FIG. 3 is a block/flow diagram showing a method for efficient defect localization/segmentation for surface defect inspection, in accordance with an embodiment of the present invention.

FIG. 3 is a block diagram illustrating one embodiment of a method for a computer implemented method for surface defect inspection. The method may include two stages. The first stage may be referred to as online training 5. On line training 5 involves the production of a classification model 15 from raw optical images test surfaces having defects, and test surfaces not having defects, which are collectively identified with reference number 4. The second stage may be referred to as offline testing 10. Offline testing 10 employs the classification model 15 to determine if defects in surfaces will render the device including the defects as being inoperable or as being operable.

In one embodiments, online training 5 may begin with collecting training data at block 6. Training data can be a collection of optical images 4 taken with a camera, such as an optical camera. Any optical camera can be suitable, which can include cameras integrated into mobile electronics, such as smart phones.

The optical images 4 may be from the surface of an electrical device that is free of defects. The optical images 4 also include images taken from the surface an electrical device that includes defects. By having images 4 of both defect surfaces and defect free surfaces comparisons can be made for the purposes of determining what types of defects are acceptable, and what types of defects are not acceptable. The defects are measured from a surface of an electronic device. The electronic device that is imaged may be a semiconductor substrate, a printed circuit board (PCB), a memory device, a display screen, a smartphone application, or a combinations thereof. Recording the optical image 4 may take place at a manufacturing line.

A binary classifier at block 8 can determine from the optical images 4, which of the optical images 4 includes defects that are unacceptable, and which of the optical images 4 either do not include defects or includes defects that are acceptable, e.g., acceptable in size, duration, and/or location. This provides one example of the defect/good classification model identified by reference number 7. The binary classifier may be provided by some form or artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 4:
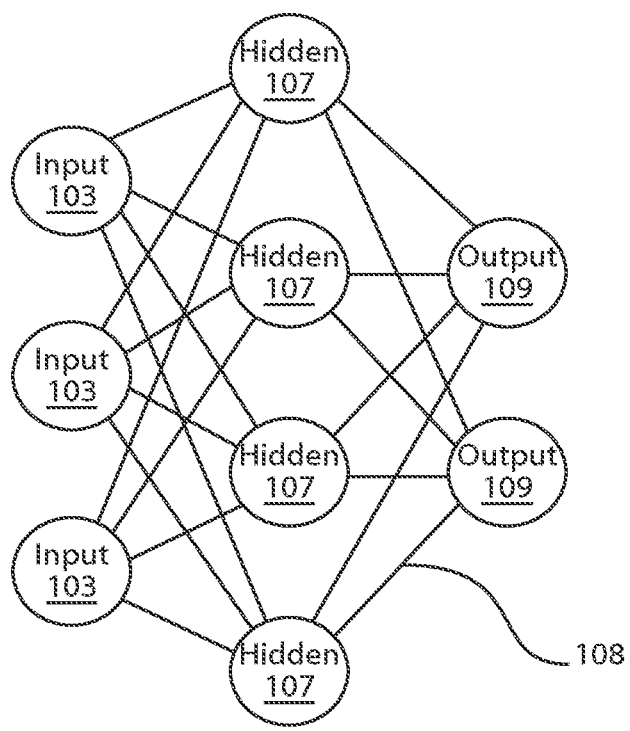
FIG. 4 is a generalized diagram of a neural network.

Referring now to FIG. 4, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 103 that provide information to one or more "hidden" neurons 107. Connections between the input neurons 103 and hidden neurons 107 are weighted and these weighted inputs are then processed by the hidden neurons 107 according to some function in the hidden neurons 107, with weighted connections between the layers. There may be any number of layers of hidden neurons 107, and as well as neurons that perform different functions. There exist different neural network structures as well, such as convolutional neural network, maxout network, etc. Finally, a set of output neurons 109 accepts and processes weighted input from the last set of hidden neurons 107.

This represents a "feed-forward" computation, where information propagates from input neurons 103 to the output neurons 109. Upon completion of a feed-forward computation, the output is compared to a desired output available from training data. The error relative to the training data is then processed in "feed-back" computation, where the hidden neurons 107 and input neurons 103 receive information regarding the error propagating backward from the output neurons 109. Once the backward error propagation has been completed, weight updates are performed, with the weighted connections being updated to account for the received error. This represents just one variety of ANN. The description of the functioning of the neural network provided with reference to FIG. 4 can provide one example of how the data from block 6 can be analyzed to provide the defect/good classification mode at block 7.

Figure 5:
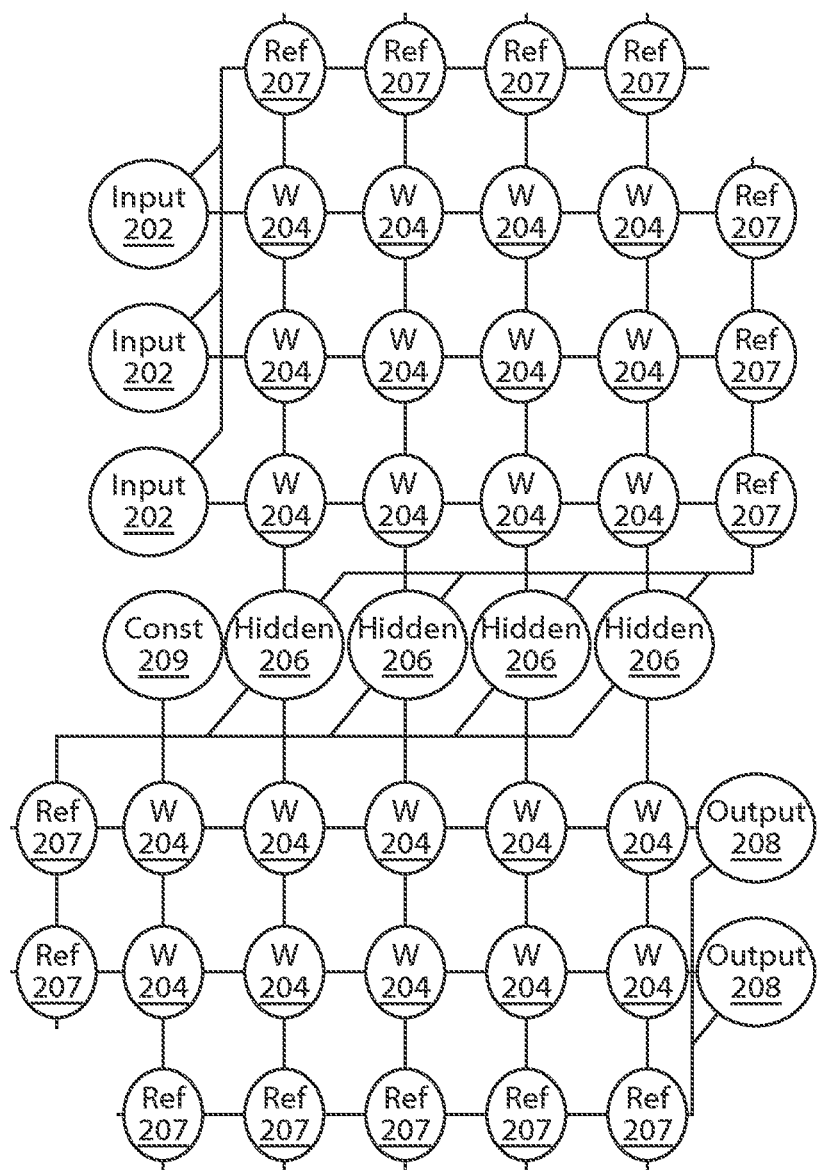
FIG. 5 illustrates an example of an artificial neural network (ANN) architecture.

FIG. 5 illustrates an example of an artificial neural network (ANN) architecture 200. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 6:
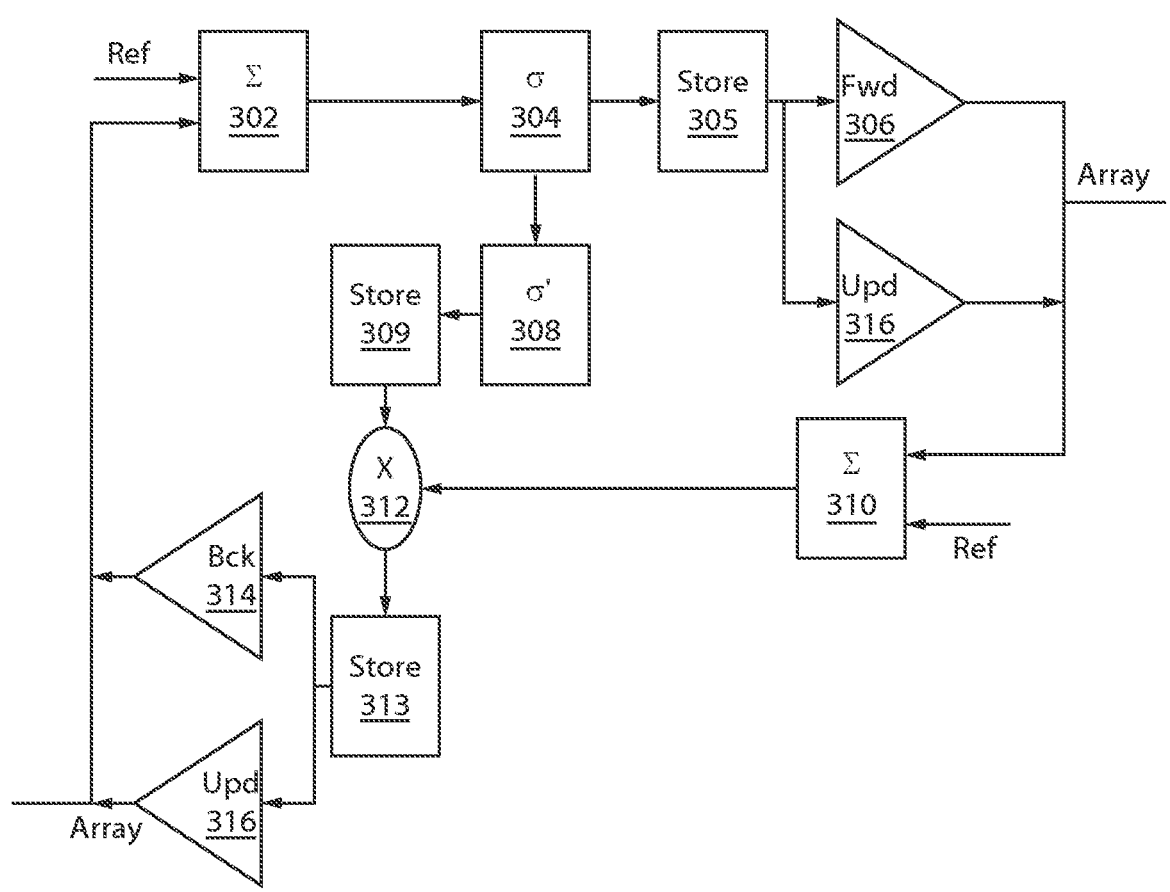
FIG. 6 is a block diagram of a neuron for use with the neural network depicted in FIG. 4 and the artificial neural network (ANN) architecture depicted in FIG. 5.

Referring now to FIG. 6, a block diagram of a neuron 300 is shown. This neuron may represent any of the input neurons 202, the hidden neurons 206, or the output neurons 208. It should be noted that FIG. 6 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In one particular embodiment, the weights 204 may be implemented in software or in hardware, for example using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

The artificial neural networks described above with reference to FIGS. 4-6 provide one mechanism by which the binary classifier at block 8 can classify the raw data from block 6 as correlating to a defect surface or a non-defect surface.

Referring back to FIG. 3, following the first classification of the raw data, the method may continue to block 9, at which a position distribution function is performed. When applying sliding window based on binary classification model, it has been determined that the model is sensitive to the defect position in the image. More specifically, the crop image covering a little part of the defect can be wrongly classified as being on a defect free surface, or be wrongly classified as being a minor defect that would not result device failure. This is because the position of the defect in the image due to cropping, as opposed to the actual location of the defect to the surface being analyzed. Analysis of the cropped imaged may inadvertently mark the surface as having minor defects at areas not critical to the device. However, as expected, the model can have robust translation invariance.

Figure 7D:
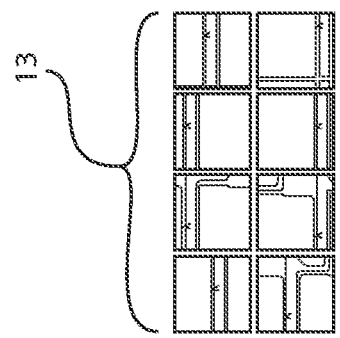
FIG. 7D illustrates a plurality of different position images of the defects that were provided by each window depicted in FIG. 7C, as the output of the position disturbance function, in accordance with one embodiment of the present disclosure.
Figure 7C:
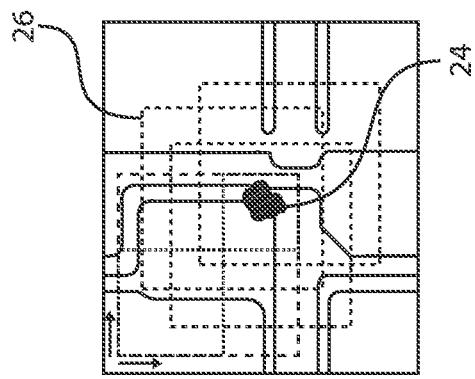
FIG. 7C illustrates different mapping windows being formed around the defect from the region of interest portion of the heat map depicted in FIG. 7B.
Figure 7B:
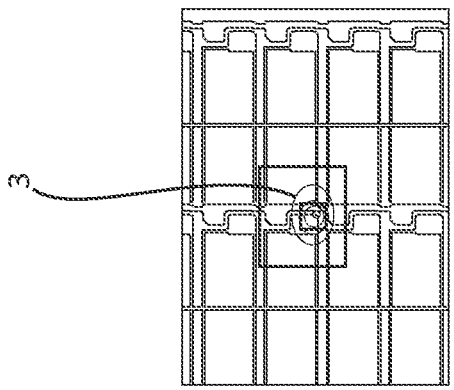
FIG. 7B is an illustration of the optical image from FIG. 7A being converted to a heat map.
Figure 7A:
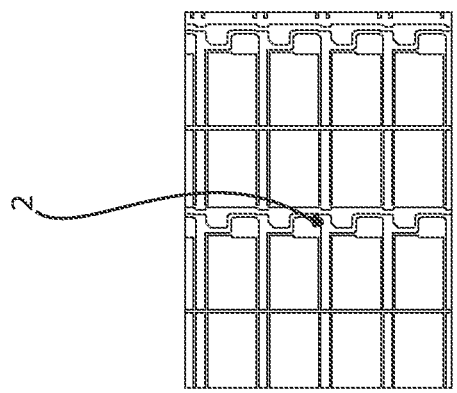
FIG. 7A is an illustration of an optical image of a defect including surface of a position disturbance function.
Figure 8:
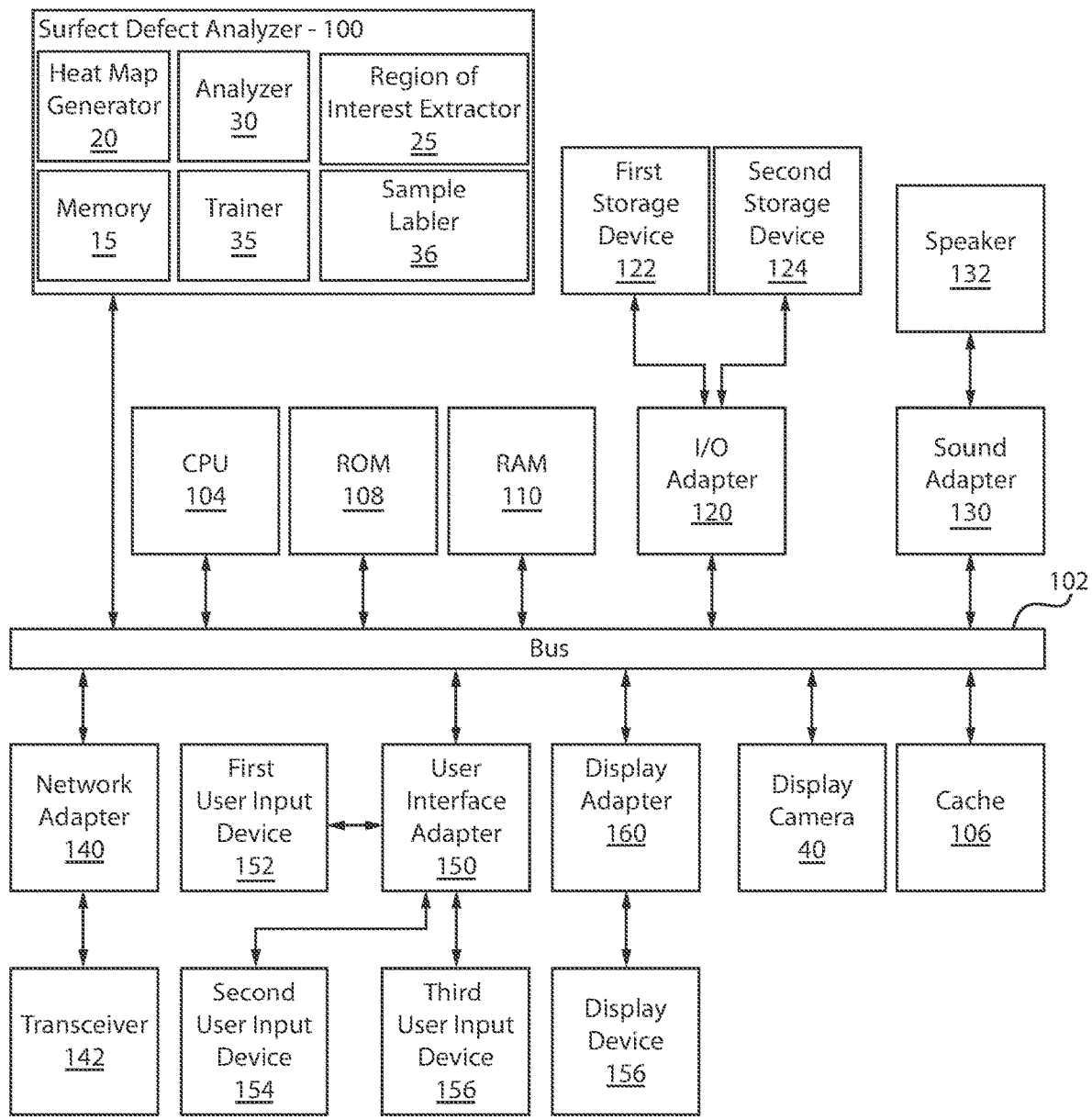
FIG. 8 is a block diagram showing a system for efficient defect localization/segmentation for surface defect inspection, in accordance with an embodiment of the present invention.

Position disturbance is proposed to solve this problem. Each of the different windows (identified by reference number 11) has a different background. Position disturbance is described in more detail with reference to FIGS. 7A-7D. In FIG. 7A an optical image is depicted for a defect 2 including surface. In FIG. 7B, the optical image is converted to a heat map. Recent deep learning work had indicated that activation heatmaps are able to illuminate rough relevant areas 3 in the input image that most intensively affect the corresponding classification results. The optical images with image-level labels (defect/good) are used to train a binary classification model. Based on this model, each optical image can obtain the activation heatmap through the convolution output of the model. FIG. 7B also illustrates that a region of interest (ROI) 24 is selected from the illuminated areas 3 of the heat map, as depicted in FIG. 7C.

The region of interest (ROI) includes the defect. FIG. 7C illustrates different mapping windows 26 being formed around the defect from the region of interest (ROI) 24. By mapping different windows 26 around the defect, the defects is depicted in each of these windows having a different background. The different position of the defects in the different images provided by each window having a different background provides position disturbance. The images that provided the position disturbance provides data, i.e., training data (crop images 13), as depicted in FIG. 7D. Each of the training data from block 6 that has been determined to have surface defects at block 8 may be treated to the position disturbance function at block 9 to provide the training data 13, i.e., series of images having position disturbance 13, at block 12. The training data at block 12 can then be analyzed with a binary classifier #2 to provide the binary classification model at blocks 14 and 15. For example, the training data at block 12 can be analyzed using machine learning, e.g., artificial neural networks, as described with reference to FIGS. 4-6, to provide a classification model at block 15. Similar to the image classifier training mode, a plurality of crop images is prepared with defect or not (defect/good) as training data. A convolutional neural network (CNN) like GoogLeNet can then be used to train this binary classification model of crop image. The classification model produced at block 15 can then be used by the system during offline testing 10 to determine whether surface images have defects that are acceptable for use in the electronic device being imaged, or the defects are not acceptable, i.e., for being too large, too prevalent, or in the wrong area.

Still referring to FIG. 3, the offline testing 10 may include the steps of recording an optical image 18 of a surface including a defect 2, as depicted in block 16; and converting the optical image 18 including the defect 2 into a heat map 19, as depicted in block 20. The step of recording the optical image may include a photograph. The photograph may be taken by an optical camera. Any optical camera will be suitable, which can include cameras integrated into mobile electronics, such as smart phones. The defects can be recorded from a surface of an electronic device. The surface of the electronic device may be the surface of a semiconductor substrate, a printed circuit board (PCB), a memory device, a display screen, a smartphone application, and combinations thereof. The optical image can be recorded from the manufacturing line on which the electrical device is being manufactured.

The method may continue with extracting a region of interest (ROI) 24 including the defect illuminated portion 3 from the heat map 19 at block 21. In the inference phase, the ROI 24 of an optical image 18 is the region of high scores on heatmap 19, e.g., the illuminated portion 3 of the heat map 19. A threshold analysis may be applied to the heatmap 19 to get the ROI 24.

Referring to FIG. 3, following the data that corresponds to a potential defect being extracted from the heat map 19 at block 21, the data from the region of interest (ROI) 24 including the defect from the heat map 19 is compared to the binary classification model using a sliding window based voting mechanism to determine in the defect in greater than or less than a threshold failure value, at blocks 22 and 23. In some embodiments, sliding windows in a sliding window based voting mechanism, the method "slides" a box around image and classifies each image crop inside a box to determine whether each images includes a defect or not. In inference phase, the sliding window mechanism is applied to the ROI to get multiple boxes. The method continues with classifying each box (each image crop) to achieve its defect confidence score. A voting mechanism is then employed to superpose a defect confidence score. For the voting mechanism, defect confidence scores are superposed in each pixel of the box, and the mechanism finally utilizes normalized values and threshold values to get the accurate segmentation results.

Block 27 illustrates a defect confidence score 28 used to provide a normalized representation of defect 29, and block 31 represents the threshold size. In this example, the normalized representation 29 of the defect is much greater than the threshold size 31 illustrating that the defect would cause the surface, e.g., electrical device surface, from which the defect was recorded to fail.

In some embodiments, the method can continue with marking the sample with a physical marker actuated by the system for surface defect analyzer 100 that is described herein. The marking can illustrate whether a surface has failed testing, and includes defects that would render a device including that surface inoperable or result in below a threshold performance; or the marking can illustrate that a surface has passed testing, and is free of any significant defects. The marking step can be automated following the comparison of the normalized representation 29 of a defect in comparison to a suitable threshold size 31 for a defect, as described above with reference to block 27 of the method described with reference to FIG. 3. The physical marker may result from an etch process e.g., substractively etching for the purpose of identifying error, stamping process, e.g., deformation, printing process or combinations thereof.

In another aspect, a system for surface defect analyzer 100 is provided that includes a camera 40 for taking optical images from a sample of a surface having surface defects 2; and a heatmap generator 20 that converts the optical images having surface defects into heatmaps. The system may further include a region of interest (ROI) extractor 25 that extracts a region of heat map including the defect. In some embodiments, the system for surface defect inspection 100 may also include an analyzer 30 including memory 15 for storing instructions to be performed by a hardware processor for classifying whether surface defects render a failed sample, the analyzer 30 comparing the region of interest including the defect from the heat map to a binary classification model using a sliding window based voting mechanism to determine in the defect in greater than or less than a threshold failure value. The analyzer 30 has been described with more detail with reference to blocks 15, 15*a*, 21, 22, and 23 of FIG. 3. The system 100 may further include a trainer 35 for producing the binary classification model from optical images including defects.

In some embodiments, the trainer 35 includes memory having a set of instructions to be executed by a hardware processor to classifying optical images as having defects or being free of defects; apply a position disturbance function to the images having defects, the position distribution function including creating heat maps for the images having defects, and taking multiple sections of the heat map each of the sections varying a location for the defect to provide cropped images for training data; and provide the classification model from the cropped images for training data. The trainer 35 has been described in greater detail with reference to the offline training 5 that is described with reference to FIG. 3.

In some embodiments, the surface defect analyzer 100 may further include a sample labeler 36. The sample labeler 36 can automatically mark a surface that has been inspected/analyzed with a mark illustrating whether substantial defects are present. The marking can illustrate whether a surface has failed testing, and includes defects that would render a device including that surface inoperable or result in below a threshold performance; or the marking can illustrate that a surface has passed testing, and is free of any significant defects. The marking step can be automated following the comparison of the normalized representation 29 of a defect in comparison to a suitable threshold size 31 for a defect, as described above with reference to block 27 of the method described with reference to FIG. 3. The physical marker may result from an etch process e.g., substractively etching for the purpose of identifying error, stamping process, e.g., deformation, printing process or combinations thereof. The sample labeler 36 may be any device that can provide a mark. For example, the sample labeler 36 may be stamp, die, engraver or any deformation apparatus. The printing process may be by spray jet/inkjet printing heads. The etch process can involve a submersion in etchant or spray etchant process that can employ masking to provide distinct markings. It is noted that the sample labeler 36 is not limited to only the examples that have been provided above.

The surface defect analyzer 100 for surface defect inspection may be further integrated into an exemplary processing system 500 to which the present invention may be applied is shown in accordance with one embodiment. The processing system 500 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 500.

Of course, the processing system 500 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
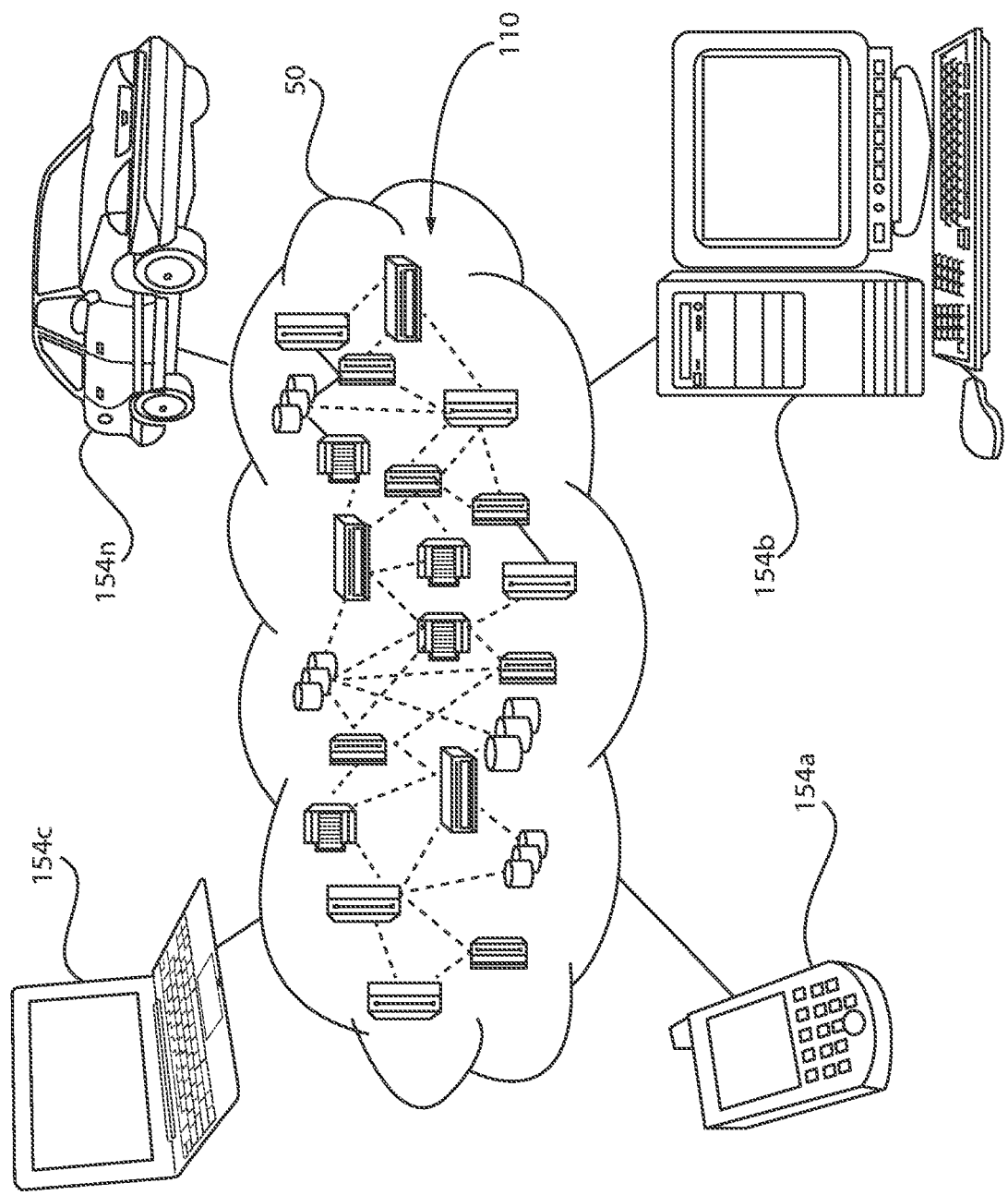
FIG. 9 is a block diagram showing an illustrative cloud computing environment, in accordance with one embodiment of the present invention.

Referring now to FIG. 9, illustrative cloud computing environment 50 is depicted. As shown, cloud computing environment 50 includes one or more cloud computing nodes 110 with which local computing devices used by cloud consumers, such as, for example, personal digital assistant (PDA) or cellular telephone 154A, desktop computer 154B, laptop computer 154C, and/or automobile computer system 154N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 154A-N shown in FIG. 9 are intended to be illustrative only and that computing nodes 110 and cloud computing environment 50 can communicate with any type of computerized device over any type of network and/or network addressable connection (e.g., using a web browser).

Figure 10:
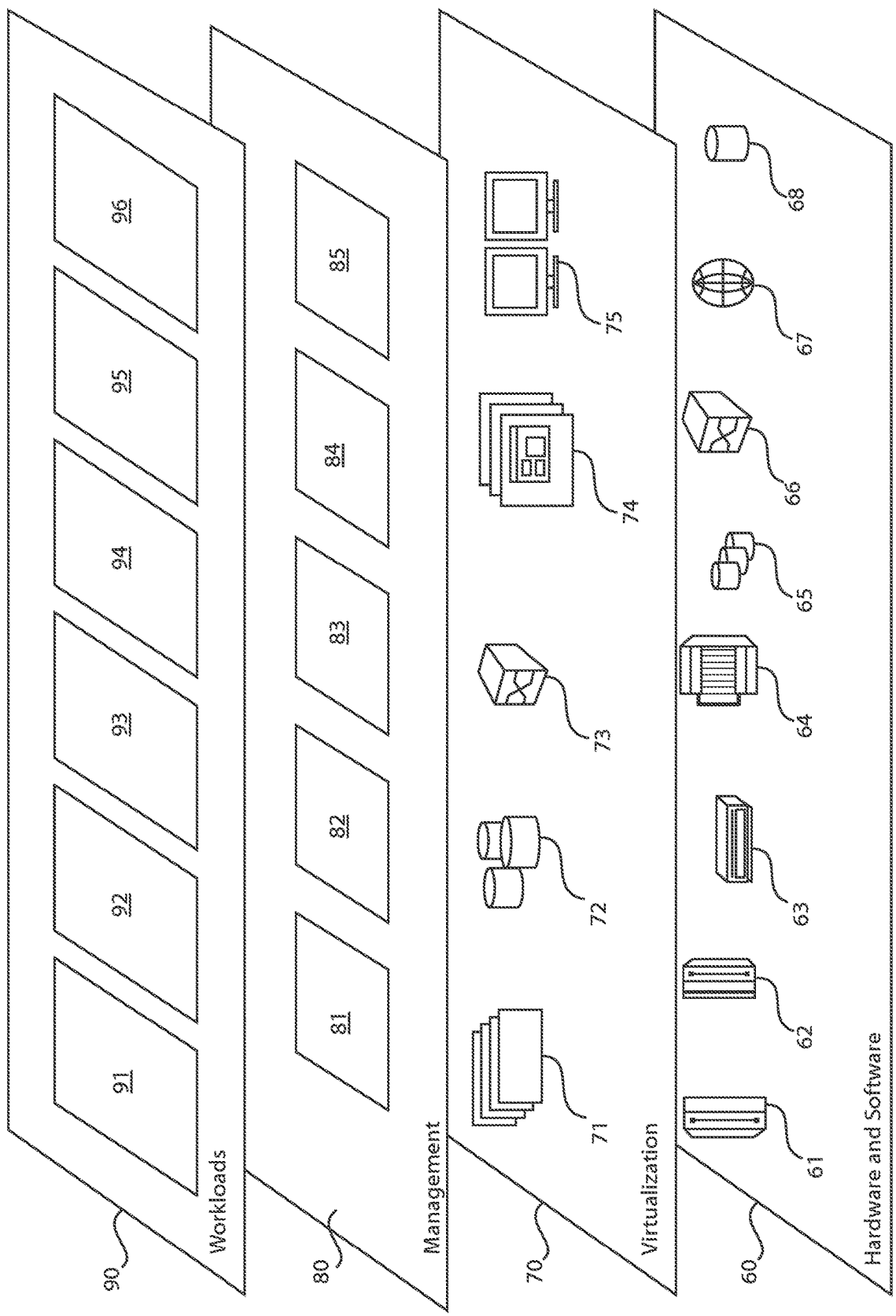
FIG. 10 is a block diagram showing a set of functional abstraction layers provided by a cloud computing environment in accordance with one embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for surface defect inspection 96.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and apparatus for efficient defect localization/segmentation for surface defect inspection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for surface defect inspection comprising:
   recording an optical image of a surface including a defect;
   converting the optical image including the defect into a heat map;

extracting a region of interest including the defect from the heat map; and comparing the region of interest including the defect from the heat map to a binary classification model using a sliding window based voting mechanism to determine if the defect is greater than or less than a threshold failure value.

2. The computer implemented method of claim 1, wherein binary classification model is formed using an offline training process that comprises:

classifying optical images as having defects or being free of defects;

applying a position disturbance function to the images having defects, the position distribution function including creating heat maps for the images having defects, and taking multiple sections of the heat map each of the sections varying a location for the defect to provide cropped images for training data; and providing a classification model from the cropped images for training data.

3. The computer implemented method of claim 1, wherein the defects are measured from a surface of an electronic device.

4. The computer implemented method of claim 1, wherein the surface of the electronic device is selected from the group consisting of a semiconductor substrate, a printed circuit board (PCB), a memory device, a display screen, a smartphone application, and combinations thereof.

5. The computer implemented method of claim 2, wherein said recording the optical image is from a manufacturing line.

6. The computer implemented method of claim 5, wherein the providing of the classification model from the cropped images for training data comprises machine learning from images not taken in real time with the manufacturing line.

7. A system for surface defect inspection comprising:

a camera for taking optical images from a sample of a surface having surface defects;

a heatmap generator including a hardware processor for the system for surface defect inspection, the heatmap generator employing the hardware processor to convert the optical images having surface defects into heatmaps;

a region of interest (ROI) extractor including the hardware processor, the ROI extractor employs the hardware processor to extract a region of heat map including the defect; and an analyzer including memory storing instructions to be performed by the hardware processor for classifying whether surface defects render a failed sample, the analyzer comparing the region of interest including the defect from the heat map to a binary classification model using a sliding window based voting mechanism to determine in the defect in greater than or less than a threshold failure value.

8. The system of claim 7, further comprising a trainer for producing the binary classification model from optical images including defects.

9. The system of claim 7, wherein the trainer includes memory having a set of instructions to be executed by a hardware processor to classifying optical images as having defects or being free of defects; apply a position disturbance function to the images having defects, the position distribution function including creating heat maps for the images having defects, and taking multiple sections of the heat map each of the sections varying a location for the defect to provide cropped images for training data; and provide the classification model from the cropped images for training data.

10. The system of claim 9, wherein the defects are measured from a surface of an electronic device.

11. The system of claim 10, wherein the surface of the electronic device is selected from the group consisting of a semiconductor substrate, a printed circuit board (PCB), a memory device, a display screen, a smartphone application, and combinations thereof.

12. The system of claim 11, wherein the providing of the classification model from the cropped images for training data comprises machine learning from images not taken in real time with the manufacturing line.

13. The system of claim 7, further comprising a defect identifying marker including the hardware process for the system for surface defect inspect for marking samples having defects having a value greater than a threshold failure value.

14. A non-transitory computer program product for surface defect inspection, the computer program product comprising a computer readable storage medium having program instructions embodied therewith, the program instructions executable by a processor to cause the processor to:

record, by the processor, an optical image of a surface including a defect;

convert, by the processor, the optical image including the defect into a heat map;

extract, by the processor, a region of interest including the defect from the heat map; and compare, by the processor, the region of interest including the defect from the heat map to a binary classification model using a sliding window based voting mechanism to determine if the defect is greater than or less than a threshold failure value.

15. The non-transitory computer program product as recited in claim 14, wherein binary classification model is formed using an offline training process that comprises:

classifying optical images as having defects or being free of defects;

applying a position disturbance function to the images having defects, the position distribution function including creating heat maps for the images having defects, and taking multiple sections of the heat map each of the sections varying a location for the defect to provide cropped images for training data; and providing a classification model from the cropped images for training data.

16. The non-transitory computer program product as recited in claim 14, wherein the defects are measured from a surface of an electronic device.

17. The non-transitory computer program product as recited in claim 14, wherein the surface of the electronic device is selected from the group consisting of a semiconductor substrate, a printed circuit board (PCB), a memory device, a display screen, a smartphone application, and combinations thereof.

18. The non-transitory computer program product as recited in claim 14, wherein said recording the optical image is from a manufacturing line.

19. The non-transitory computer program product as recited in claim 14, wherein the providing of the classification model from the cropped images for training data comprises machine learning from images not taken in real time with the manufacturing line.

20. The non-transitory computer program product as recited in claim 14, wherein the method further comprises a defect identifying marker for marking samples having defects having a value greater than a threshold failure value.

* * * * *